United States Patent
Watson et al.

(10) Patent No.: US 9,635,135 B1
(45) Date of Patent: Apr. 25, 2017

(54) SYSTEMS AND METHODS FOR HANDLING REPLIES TO TRANSACTION REQUESTS

(75) Inventors: James Christopher Watson, San Antonio, TX (US); Gina Rachele Smith, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 688 days.

(21) Appl. No.: 12/106,855

(22) Filed: Apr. 21, 2008

(51) Int. Cl.
G06F 15/16 (2006.01)
H04L 29/08 (2006.01)

(52) U.S. Cl.
CPC .................................. *H04L 67/325* (2013.01)

(58) Field of Classification Search
CPC ................................................... H04L 67/325
USPC ......................................................... 709/234
See application file for complete search history.

(56) References Cited

U.S. PATENT DOCUMENTS

| | | | |
|---|---|---|---|
| 5,657,450 A * | 8/1997 | Rao et al. | |
| 5,862,326 A | 1/1999 | Bapat | |
| 5,896,376 A | 4/1999 | Alperovich et al. | |
| 6,138,168 A * | 10/2000 | Kelly et al. | 719/310 |
| 6,212,175 B1 | 4/2001 | Harsch | |
| 6,529,932 B1 * | 3/2003 | Dadiomov et al. | 718/101 |
| 6,631,512 B1 | 10/2003 | Onyeabor | |
| 6,771,665 B1 * | 8/2004 | Reed et al. | 370/475 |
| 7,088,698 B1 | 8/2006 | Harsch | |
| 7,089,302 B1 | 8/2006 | Churchyard et al. | |
| 7,110,995 B2 | 9/2006 | Kirkland | |
| 7,475,089 B1 * | 1/2009 | Geddes | |
| 7,475,147 B2 | 1/2009 | Saito et al. | |
| 7,590,881 B2 | 9/2009 | Cormier | |
| 7,711,956 B2 * | 5/2010 | Kinoshita et al. | 713/168 |
| 2002/0095505 A1 * | 7/2002 | Ono et al. | 709/227 |
| 2002/0167942 A1 * | 11/2002 | Fulton | 370/352 |
| 2003/0005113 A1 | 1/2003 | Moore et al. | |
| 2003/0093471 A1 | 5/2003 | Upton | |
| 2003/0156547 A1 | 8/2003 | Peleg | |
| 2004/0267878 A1 | 12/2004 | Osias | |

(Continued)

OTHER PUBLICATIONS

Penchikala, Srini; "Asynchronous Messaging Made Easy With Spring JMS", Published on ONJava.com (http://www.onjava.com/), Retrieved from the internet <http://www.onjava.com/pub/a/onjava/2006/02/22/asynchronous-messaging-with-spring-jms.html>. Copyright © 2007 O'Reilly Media, Inc.

(Continued)

*Primary Examiner* — June Sison
*Assistant Examiner* — Steven Nguyen
(74) *Attorney, Agent, or Firm* — Eric L. Sophir; Dentons US LLP

(57) ABSTRACT

A client application may use a request/response protocol to request that a server perform a transaction. The client application may use an adapter to issue a request and to wait for a reply. The adapter may wait for the reply for a specific amount of time. If a reply is received after the time expires, then the reply may be received by a delayed reply handler employed by the client application. If the delayed reply handler receives a reply, it may identify the request to which the reply relates, and may then cause action to be taken. The particular action to be taken may depend on the nature of the transaction to be performed, and/or whether the transaction succeeded or failed.

21 Claims, 7 Drawing Sheets

(56) References Cited

U.S. PATENT DOCUMENTS

| | | |
|---|---|---|
| 2005/0138117 A1 | 6/2005 | Chaney et al. |
| 2005/0198190 A1 | 9/2005 | Zavalkovsky et al. |
| 2005/0223021 A1 | 10/2005 | Batra et al. |
| 2005/0257258 A1 | 11/2005 | Kinoshita et al. |
| 2006/0017953 A1 | 1/2006 | Ly et al. |
| 2006/0031520 A1 | 2/2006 | Bedekar et al. |
| 2006/0039401 A1 | 2/2006 | Shenfield et al. |
| 2006/0095576 A1 | 5/2006 | Perry et al. |
| 2006/0136443 A1* | 6/2006 | Dulay et al. .................. 707/101 |
| 2006/0251125 A1 | 11/2006 | Goring et al. |
| 2007/0067496 A1 | 3/2007 | Deiretsbacher et al. |
| 2007/0180116 A1* | 8/2007 | Kim et al. .................... 709/226 |
| 2007/0203708 A1 | 8/2007 | Polcyn et al. |
| 2007/0299928 A1 | 12/2007 | Kohli et al. |
| 2008/0177698 A1* | 7/2008 | Agarwal et al. ................. 707/2 |
| 2009/0055891 A1 | 2/2009 | Okamoto et al. |
| 2009/0144359 A1 | 6/2009 | Karlsen et al. |

OTHER PUBLICATIONS

Raj, Gopalan Suresh—"Guarantee inter-enterprise message delivery using JMS", Retrieved from the internet <http://209.85.173.104/search?q=cache:HoygSKGE91gJ:www.fiorano.com/whitepapers/jr_messaging.pdf+Guarantee+interenterprise+message+delivery+using+JMS&hl=en&ct=clnk&cd=1&gl=us>.

* cited by examiner

ABCBank.com

Transfer money

From acct.: _____ 102
To acct.: _____ 104
Amt.: $ _____ 106

Submit 118

Deposit check

To acct.: _____ 108
Amt. $ _____ 110
File name with check image: _____ 112

Submit 120

Pay bill

Payee: _____ 114
Amt.: $ _____ 116

Submit 122

SYSTEMS AND METHODS FOR HANDLING REPLIES TO TRANSACTION REQUESTS

CROSS-REFERENCE TO RELATED APPLICATIONS

This application is related by subject matter to the inventions disclosed in the following commonly assigned applications, the entirety of which are hereby incorporated by reference herein: U.S. patent application Ser. No. 12/106,844, and U.S. patent application Ser. No. 12/106,864, each filed on Apr. 21, 2008, and each entitled "Systems and Methods for Handling Replies to Transaction Requests".

BACKGROUND

Systems that enable users to perform transactions often employ a client application and a server application that communicate with each other. The server application performs the underlying work to complete the transaction, and has access to the records to which the transaction relates. Normally, a user makes a request to perform the transaction, but the server application is not directly exposed to the user. Rather, a client application provides an interface through which the user communicates. The user interacts with the client application to indicate what the user wants to do. The client application then makes the appropriate request to the server application.

Web applications that perform banking transactions, retail purchase transactions, etc., are examples of software systems that follow this model. In a typical web transaction, a front-end web server runs a client application that interacts with a user through the user's browser. The client application then communicates with the back-end server application to request that the back-end application perform the transaction the user wants to perform. For example, a user may visit a bank web site to transfer money. The bank's front-end server cluster runs a web application that receives the user's login credentials, receives the account numbers that the money is to be transferred from and to, receives the amount of money to transfer, etc. The web application then makes a request to the bank's back-end-server to have the transaction performed. During the time that the request is being processed, the client application may show its user a message such as "Please wait while your transaction is being processed." Behind the scenes, the web application either has issued, or is in the process of issuing, a request to have the transaction performed on the back end. The message may be displayed while the application is waiting for a reply that indicates whether the transaction was completed. Banking systems are one example of a system that may work in this manner, although many systems follow this model. For example, on-line retailers may use a web application to take customer orders, where the web application communicates the order to a back-end server for processing. Similarly, users of a large-scale database typically do not access the database directly, but instead access it through user applications that make request to the underlying database system.

When a one application (the requestor) makes a request to another application (the requestee), the request may be sent according to various different models. Request/response and send-and-forget are two such models. In a request/response protocol, the requestor waits for a reply from the requestee. The reply may indicate whether the transaction has been completed. In a send-and-forget model, the requestor sends a request without waiting for, or expecting to receive, a reply. Thus, in a send-and-forget model, the request may be lost on its way to the requestee, or the requestee may fail to complete the request, and the requestor may not learn of the fate of the request.

When the request/response model is used, communication between the requestor and the requestee has traditionally been synchronous. Thus, the requestor and the requestee participate in communication that follows a conversation model, in which the requestor sends a request and the requestee sends a reply in the same conversation. In a web application, for example, a user might see a "please wait" message while this conversation is open and while the reply is being awaited. But synchronous communications is sometimes not practical, since it may consume the resources of the requestor and requestee while they both keep the conversation open. Thus, the sending of requests may be done asynchronously through a store-and-forward model in which a message broker receives requests from the requestor and transmits requests to the requestee asynchronously.

However, asynchronous transmission of requests leaves open the possibility that a reply might be received long after the request is made. A request might be queued at the message broker for some time after it was sent by the requestor, but before being forwarded on to the requestee. Thus, there is a possibility that the requestee might issue a reply long after a synchronous conversation with the requestor would have timed out. A reply may be generated that is not part of any synchronous conversation. At least in some contexts, mechanisms have not been available to handle such replies.

SUMMARY

A request/response model of interaction between client and server applications may be implemented in a way that facilitates the use of asynchronous communication. A client application sends, to a server application, a request to perform a transaction. The client application waits for a reply from the server. The reply may indicate whether the transaction has been completed. The client may have a timeout mechanism, which waits for the reply for a certain amount of time after the request is issued. For example, the client application may display a "please wait" message to a user until the timeout expires. If the reply is received before the timeout expires, then the reply is processed and the result of the transaction may be reported to the user.

If no reply is received before the timeout expires, then the client application may not know whether the requested transaction completed. Thus, the client application may not be able to report to its user that the transaction succeeded or failed, because the application does not know. Thus, the client may provide a delayed reply handler to receive replies that arrive after the timeout. The delayed reply handler may contain logic that identifies the request to which a particular delayed reply relates. Moreover, the delayed reply handle may contain logic that determines what to do when such a reply is received, such as reporting the result of the transaction to the user. Also, the application may be implemented so as to appropriately advise the user of the status of a transaction in the event that a reply is not received before timeout. For example, it may be inappropriate to display a "please wait" message to a user for longer than, say, one minute. However, if one minute passes without a reply, the application could inform the user that the user will receive an e-mail once the status of the transaction has been resolved. For example, if the delayed reply handler receives a reply one hour later, then the handler could e-mail the user informing that the transaction has completed or failed. As another example, if the reply does not arrive for, say, twenty-four hours, then a human operator could be enlisted to investigate the issue and could e-mail the result manually to the user (although the existence of a delayed reply handler may reduce the proportion of irregularities that are handled by humans).

This summary is provided to introduce a selection of concepts in a simplified form that are further described subsequently in the detailed description section. This summary is not intended to identify key features or essential features of the claimed subject matter, nor is it intended to be used to limit the scope of the claimed subject matter.

BRIEF DESCRIPTION OF THE DRAWINGS

FIG. 1 is a block diagram of the web interface of an example client application.

DETAILED DESCRIPTION

Figure 2:
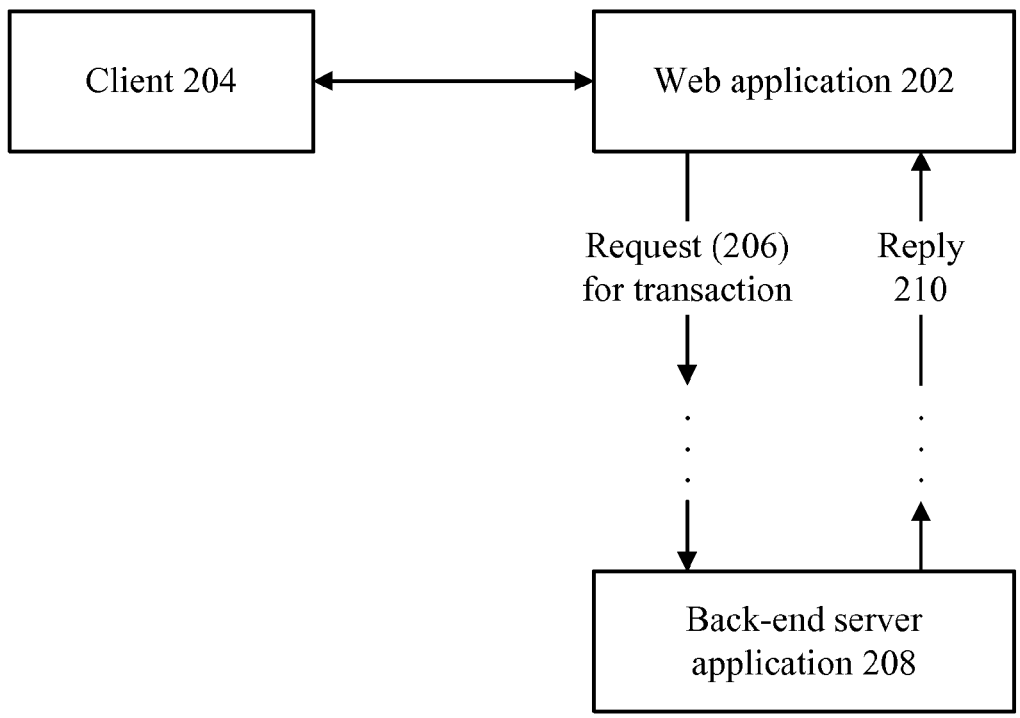
FIG. 2 is a block diagram of an example scenario in which a client uses a web application to perform a transaction with a server application.

When client and server applications communicate in a request/response protocol, the client application may issue a request to have the server perform a transaction. The server may issue a reply when the transaction succeeds or fails, and the client application may await this reply. If the reply is not received in a certain time window, arrangements may be made to process this late-received reply.

Turning now to the drawings, FIG. 1 shows an interface 100 of an example client application, as might be seen on a web browser. In the example of FIG. 1, the application is a banking application provided by a bank, although any type of application could be used, and such application could be provided by any type of organization. Interface 100 offers a user the opportunity to perform various types of transactions, such as transferring money, depositing a check, or paying a bill. For example, a user could enter details of a money transfer transaction by entering numbers of the "from" and "to" accounts into data-entry fields 102 and 104, respectively, and entering the amount of money to transfer into data-entry field 106. Similarly, a user could request to deposit a check by entering the deposit account number into field 108, the amount of the check into field 110, and the name of a file that contains an image of the check into field 112. As a further example, a user could request to pay a bill by entering the name of the payee into field 114 and the amount of the payment into field 116. (Other information, such as the payee's address and/or the user's account number with the payee, could be entered into other fields.)

The information that is entered into the various fields describes certain details relating to a transaction. To initiate the transaction, a user could click one of submit buttons 118, 120, or 122.

When a submit button is clicked, the client application may submit the information entered into the fields as part of a request to perform the described transaction. For example, it is often the case that the client application itself does not directly perform transactions such as transferring money, paying bills, etc., but rather uses the information collected from a user to request that a back-end server application perform the transaction. The client application submits an appropriate request to the server application and waits for the server to perform the requested transaction. An example scenario in which this process occurs is shown in FIG. 2.

In FIG. 2, web application 202 (which is an example of a kind of client application) interacts with a user through a client 204. Client 204 may, for example, be a web browser. Thus, web application 202 may present an interface (such as interface 100, shown in FIG. 1), with which a user may interact with the assistance of a web browser. For example, web application 202 may present interface 100 (shown in FIG. 1) in the form of a Hypertext Markup Language (HTML) web page and may deliver this page to a web browser on a user's computer. Moreover, web application 202 may receive information collected through web browser, such as the information entered into the fields shown in FIG. 1.

Based on the information received from the web browser, web application 202 may make a request 206 for a transaction to be performed. For example, if a user requests to transfer money from one account to another, then request 206 may include a request to transfer money, and may also include the numbers of the "from" and "to" accounts, and the amount of the transfer. However, request 206 may take any form, and the foregoing is merely one example of the content of request 206. Request 206 is made to back-end server application 208. The ellipses between web application 202 and back-end server application 208 indicates that request 206 may travel through various components on its way to back-end server application 208. For example, back-end server application 208 may employ an adapter that receives requests. Moreover, communication between web application 202 and back-end server application 208 may be mediated by a store-and-forward message broker that queues requests received from web application 202 and dispatches these requests when appropriate.

Back-end server application 208 performs (or attempts to perform) the requested transaction. When the transaction has completed or failed, back-end server application 208 issues reply 210 indicating what happened to request 206 (which may sometimes be referred to as the resolution of the request). For example, if back-end server application 208 is able to complete the transaction indicated in request 206, then reply 210 indicates that the transaction completed successfully. On the other hand, if back-end server application 208 determines that the transaction cannot be completed, the reply 210 indicates that the transaction has failed, and may also indicate a reason for failure.

Figure 3:
FIG. 3 is a block diagram of an example message that may be shown by a client application while a transaction is being processed.

The process of issuing a request and receiving a reply could take any amount of time. The process could be nearly instantaneous, or could take several minutes, or even hours. During the time between the request and the reply, a client application might show the user a screen such as web page 300 shown in FIG. 3. Web page 300 contains a message 302, which asks the user to wait while the transaction is processed. Some web pages show graphics like ticking clocks, or hourglasses, as a way of asking the user to wait momentarily.

Figure 4:
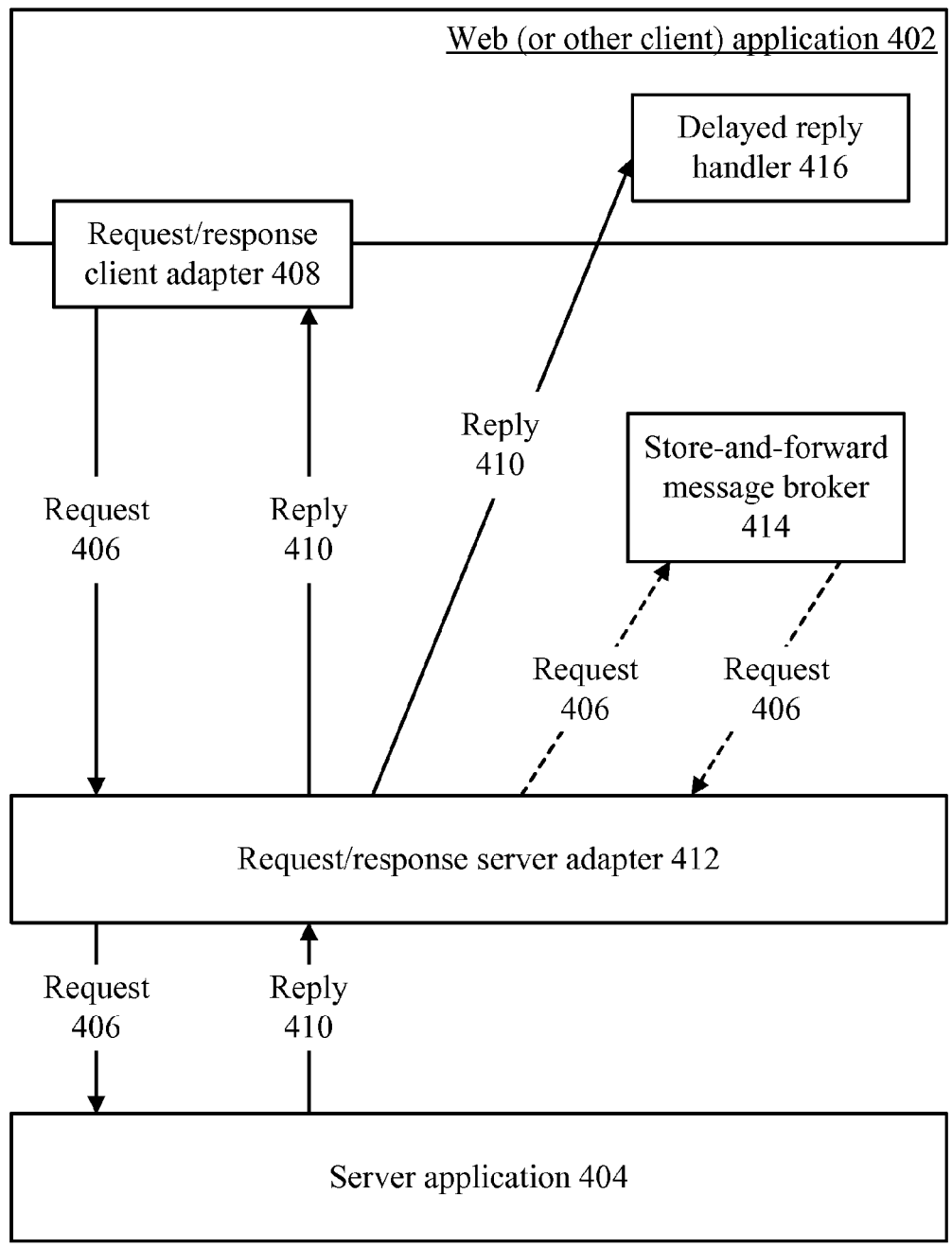
FIG. 4 is a block diagram of an example scenario in which requests and replies are communicated between a client application and a server application.

Normally, the transaction resolves within relatively short order. For example, a transaction may be requested, and a reply received, within the space of a few second. At that point, page 300 is removed and replaced with an indication of the resolution, such as "Your transaction is confirmed," or "Your transaction failed—please try again later." However, in some cases, a reply is not received. Many web applications (or other client application) employ a timeout. When time expires, the application no longer asks the user to wait for the transaction to process, even though the application does not know whether the transaction succeeded, or failed, or even if the request for the transaction even reached the server application. Thus, upon timeout, the web application (or other client application) may present the user with a message such as, "We will contact you later regarding your transaction," or "Transaction could not be confirmed, but we will complete your transaction and contact you when it has been confirmed." FIG. 4 shows an example scenario in which a request is issued, and in which a reply to the request may be handled even if the reply is received after the timeout.

Application 402 is a web application (or other type of client application, such as a database application). Application 404 is a server application. As previously discussed the web application (or other type of client application) may interact with a user to receive a request for a transaction, and may communicate the request to a server application to have the transaction performed. Applications 402 and 404 may interact with each other in this manner.

When application 402 has interacted with a user to determine the type of transaction to be performed, application 402 may send request 406 to application 404 to request that the transaction be performed. Request 406 may travel through various components. For example, application 402 may comprise, or make use of, request/response client adapter 408. Application 402 may indicate to adapter 408 that a request is t be sent. Adapter 408, in turn, sends the request to the appropriate server application (e.g., application 404) through the appropriate communication channels and/or mechanisms. Adapter 408 may also await reply 410, which, if received, may indicate whether the requested transaction has been performed or has failed.

As previously noted, request 406 may travel through various components. For example, adapter 408 may send a request to request/response server adapter 412. Adapter 412 receives requests on behalf of application 404, and transmits any replies that application 404 may generate. When adapter 412 receives request 406, it may forward request 406 to application 404. Alternatively, adapter 412 may forward request 406 to store-and-forward message broker. The forwarding of request 406 to store-and-forward message broker 414 may occur, for example, if application 404 is not ready to receive request 406, or for any other reason. If request 406 is forwarded to message broker 414, then message broker 414 may queue request 406 to be forwarded to adapter 412 at a later time. Thus, adapter 412 may receive request 406 at a later time when application 404 is ready to receive it.

After application 404 receives request 406, it may attempt to perform a transaction specified by request 406. The requested transaction may be performed, or, alternatively, application 404 may be unable to complete the transaction for some reason. For example, request 406 may specify parameters for the transaction that are invalid. Or, the resources (e.g., devices, databases, etc.) that application 404 would use to complete the transaction may be unavailable (or may continue to be unavailable after some number of retries). The resolution of request 406 may be reported in the form of reply 410. Thus, reply 410 may contain data indicating that the transaction was completed or that the transaction failed. Reply 410 may also include data relating to the completion or failure. For example, if the transaction fails, reply 410 may include an error code indicating the reason for failure. Or, if the transaction succeeds, reply 410 may contain data that was generated or obtained as a result of completing the transaction (e.g., a confirmation number).

Application 404 may use adapter 412 to send reply 410 back to application 402. Adapter 412 may determine how and/or where to send reply 410 based on various factors. One such example factor is how long as elapsed since request 406 was sent. For example, adapter 412 may observe the concept of a timeout—e.g., time expires n seconds after request 406 was sent. Adapter 412 may be configured to send reply 410 to adapter 408 if reply 410 is being sent before time expires, and to send reply 410 to delayed reply handler 416 if reply 410 is being sent after time expires. Adapter 412 may contain logic that determines, based on the time that request 406 was sent, when the timeout has occurred. Thus, adapter 412 may be able to choose the appropriate place to send reply 410.

The existence of delayed replies may be a consequence of the use of store-and-forward message broker 414 to send request 406 at a time later than when request was issued. In a synchronous communication model, applications 402 and 404 may have a communication channel open though which request 406 and reply 410 are communicated in a single conversation. In such a model, if application 404 is unavailable to receive request 406, the conversation (and the transaction that it attempts to communicate) may be aborted and started anew at a later time. However, the use of store-and-forward message broker 414 to implement an asynchronous way of delivering requests means that some requests may be received by application 404 long after they are issued. For example, request 406 might sit in a dispatch queue maintained by store-and-forward message broker 414 until after application 402 has ceased to display a "please wait" screen (such as that shown in FIG. 3). Thus, by the time request 406 arrives at application 404, the user of application 402 may have moved onto another task or may have terminated the session with application 402. In this case, reply 410 may likewise be sent after the user of application 402 is no longer being presented with a "please wait" message, or perhaps after the user has terminated his or her session with application 402. This example demonstrates a scenario in which reply 410 is delayed, and also demonstrates how the use of store-and-forward message broker 414 to deliver request 406 could result in a delayed reply. However, a delayed reply may arise in any context and for any reason.

Delayed reply handler 416 may be a component that is part of, or used by, application 402 to process replies that arrive after a timeout has occurred. Delayed reply handler 416 may be separate from the adapter 408 that handles replies received before the timeout occurs. Issues that may arise in receiving a delayed reply include:
  determining which request the delayed reply corresponds to; and
  determining what to do when a reply has been received after timeout.
Delayed reply handler may include logic that addresses these issues. For example, a request may include some identification of the request, and a reply to a particular request may include that identification. A request that is awaiting a reply may be stored. Delayed reply handler 416 may look up the original request in a store based on the identifier contained in the reply, and may record the fact that the request has been replied to. Moreover, once a reply has been received to a request, delayed reply handler 416 may determine what to do based on the reply. For example, if the reply indicates that the transaction specified in the original request succeeded, delayed reply handler 416 may determine that the result is to be reported to the user who requested the transaction. As another example, if the reply indicates that the transaction failed, delayed reply handler 416 may determine that the transaction is to be requested repeatedly until it succeeds (or until some number of attempts have been made). Or, delayed reply handler 416 may determine that the failure is to be reported to the user without attempting to perform the transaction again. As a further alternative, delayed reply handler may determine that a failed transaction is to be reported as an exception, to be handled by a human agent. (However, the ability to handle delayed replies in an automated fashion—e.g., by reporting successes to the user, or by retrying in the event of failure—may result in fewer irregularities being sent to humans for handling, and thus may reduce the human labor cost of operating a software application.) The decision as to what to do when a delayed reply is received may depend on the nature of the transaction. For example, if the requested transaction is to deposit a check, it may make sense to keep re-issuing the request until the deposit transaction succeeds. On the other hand, if the requested transaction is a retail purchase, it may make sense to e-mail the user to inform him or her that the transaction did not succeed and inviting the user to reinitiate the transaction on the appropriate web site.

Figure 5:
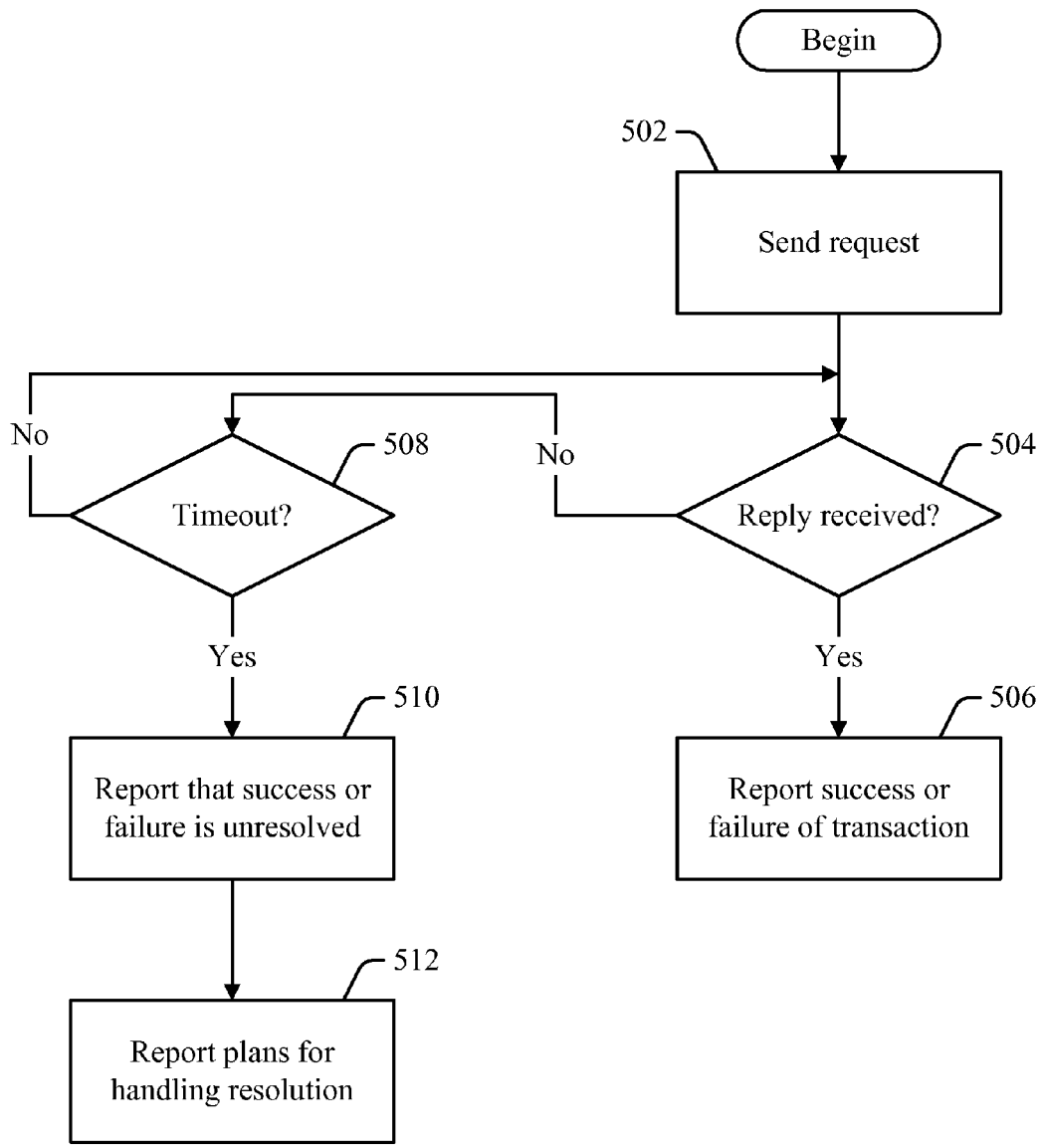
FIG. 5 is a flow diagram of an example process in which a client application issues a request and awaits a reply.
Figure 6:
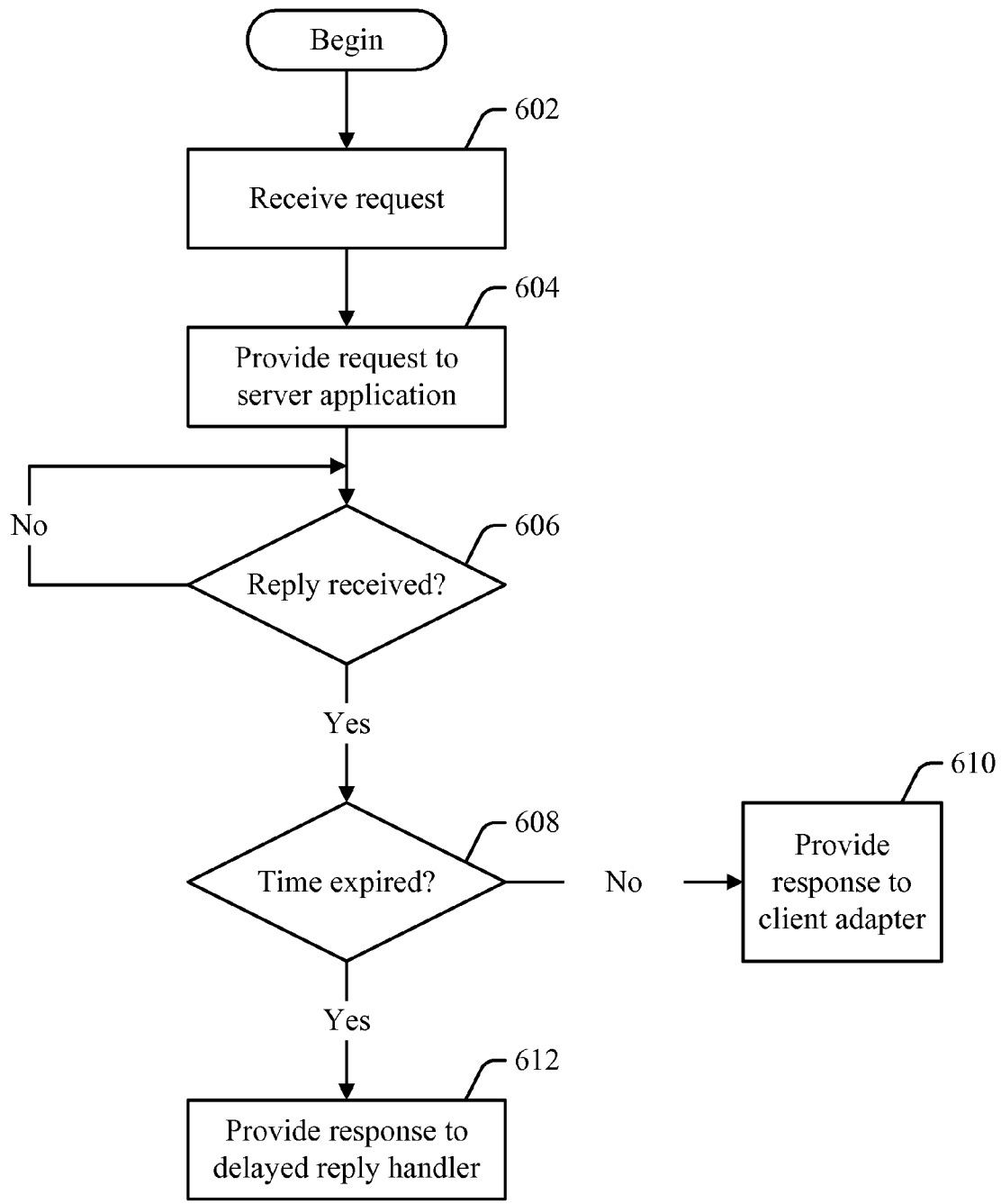
FIG. 6 is a flow diagram of an example process in which a server adapter provides a reply either to a client adapter or a delayed reply handling depending on whether time has expired.
Figure 7:
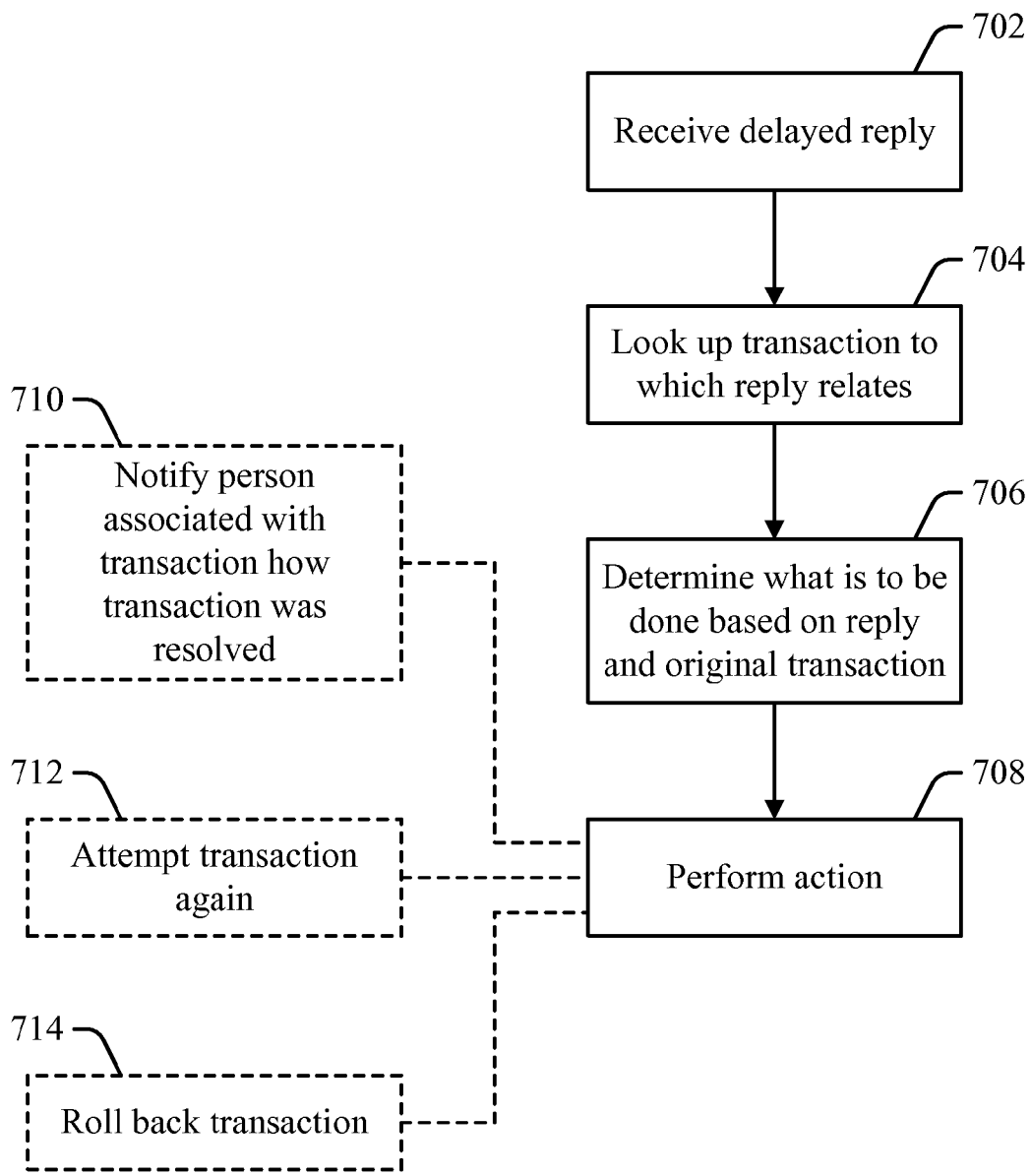
FIG. 7 is a flow diagram of an example process in which a delayed reply is received.

FIG. 5 shows an example process in which an application (such as application 402, shown in FIG. 4) issues a request and awaits a reply. This process (as well as the processes shown in FIGS. 6 and 7) may be carried out with respect to the systems described herein, but may also be carried out in, or with respect to, any system. Additionally, each of the flow diagrams in FIGS. 5-7 shows an example in which stages of a process are carried out in a particular order, as indicated by the lines connecting the blocks, but the various stages shown in these diagrams can be performed in any order, or in any combination or sub-combination.

At 502, an application sends a request. For example, the application may be a banking application, retail application, etc., that collects information from a user through a web browser. The information may describe a transaction that the user wishes to perform, such as to transfer money from one bank account to another or to purchase a particular item. The request sent at 502 may describe the transaction to be performed. The request may be sent, for example, to a server application. The request may be sent by any component that is part of, or is used by, the sending application. For example, an application may employ adapter 408 (shown in FIG. 4) to send the request.

The application that sent the request awaits a reply. During the time that a reply is being awaited, the application may display a "please wait"-type message to the user, such as that shown in FIG. 3. If a reply is received (as determined at 504), then the application reports the success or failure of the request (at 506), depending on whether the reply indicates success or failure. If the reply is not received, then the application determines (at 508) whether the timeout has expired. If the timeout has not expired, then the process continues to wait for the reply and returns to 504 to determine if the reply has been received.

If a timeout has occurred without a reply having been received (as determined at 508), then the application may report that the success or failure of the transaction is unresolved (at 510). Moreover, the application may report the plans for resolving the transaction (at 512). For example, the application may report that the user will be advised (e.g., in an e-mail) of the result of the transaction, or the user may be told that the system will complete the transaction and will report to the user when the transaction has been completed. The application typically would not report, at this time, that the transaction has succeeded or failed, since the lack of a reply normally means that the application does not know whether the transaction succeeded or failed.

FIG. 6 shows an example process that may be performed by a server adapter to decide whether to send a reply to a client adapter or to a delayed reply handler. At 602 a request is received by the server adapter. The request may be received from the client application (e.g., application 402, shown in FIG. 4), or from a store-and-forward message broker (e.g., message broker 414, shown in FIG. 4). At 604, the request is provided to a server application. The server adapter then waits for a reply.

If a reply is received (as determined at 606), then a determination is made as to whether time has expired (at 608). As previously noted, a client application may ask the user to wait for a certain amount of time, after which it may inform the user that it will be notified later of a transaction's resolution. If the application is still within the waiting period, then it may be determined at 608 that time has not expired; otherwise, it may be determined that time has expired. If time has not expired, then the reply is provided to the client adapter (at 610). If time has expired, then the reply is provided to the delayed reply handler (at 612). (If, at 606, it had been determined that a reply had not been received, then the process loops back to continue to wait for a reply.)

FIG. 7 shows an example process of processing a delayed reply. This process may be performed, for example, by delayed reply handler 416 (shown in FIG. 4), but could also be performed by any other component. At 702, a delayed reply is received. At 704, the transaction to which the reply relates is looked up. For example, if requests have been stored with identifying information, then the reply (which may contain this identifying information) may be compared with the requests to identify the request to which the reply relates. At 706, a determination is made as to what is to be done based on the reply and on the original transaction. For example, the action to be taken may be different depending on whether the reply indicates that the transaction succeeded or failed. Moreover, the action to be taken may differ depending on the type of transaction that is being requested. Some examples of different actions that may be performed are discussed subsequently in connection with 710, 712, and 714.

At 708, the action determined at 706 is performed. This action may take various forms. For example, the person associated with the transaction may be notified (e.g., by e-mail) as to how the transaction was resolved (at 710). For example, a successful or failed transaction may be reported to the user by e-mail. As another example, in the case of a failed transaction, another attempt may be made to perform the transaction (at 712)—e.g., by issuing another request for the transaction. For example, in the case where the transaction is to deposit a check, it may make sense to keep trying to deposit the check until the transaction succeeds, since customers who attempt to deposit checks normally expect the deposit to succeed eventually, and may not normally expect to receive a report that the deposit has failed. As yet another example, in the case of a successful transaction, it may make sense to roll back the transaction (at 714)—e.g., if the transaction is of such a nature that the user would only want it to be performed if it can be confirmed as having succeeded at the time of a request, then a transaction that is later reported as having been successful could be rolled back in order to return to the state the user expects. The actions shown in connection with 710, 712, and 714 are merely examples. Any type of action could be performed, and the choice of action could be based on the nature of the transaction, whether it succeeded or failed, or any other consideration.

Figure 8:
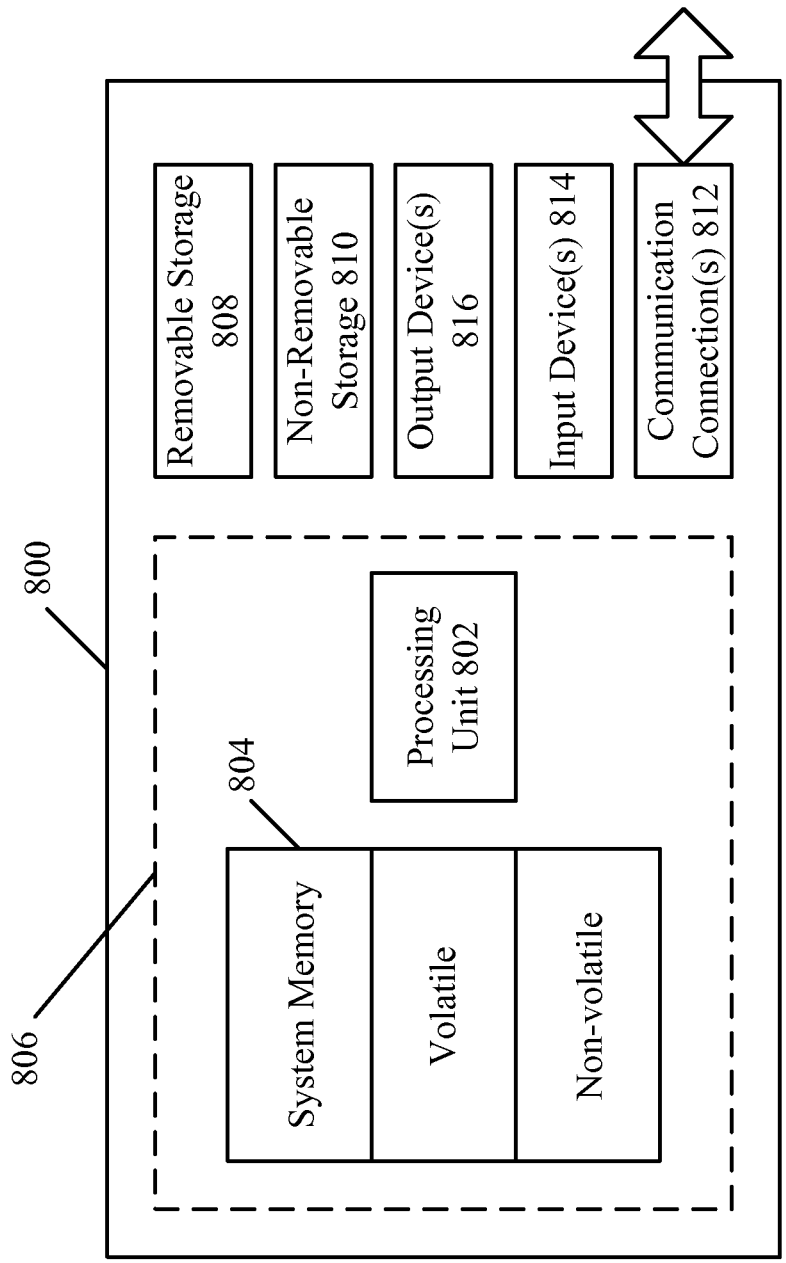
FIG. 8 is a block diagram of an example computing environment that may be used in connection with implementations of the subject matter described herein.

The subject matter described herein may be implemented through the use of a computer system, or other type of device that has some computing mechanism(s). FIG. 8 shows an example computing environment in which example embodiments and aspects may be implemented. The computing system environment is only one example of a suitable computing environment and is not intended to suggest any limitation as to the scope of use or functionality.

Numerous other general purpose or special purpose computing system environments or configurations may be used. Examples of well known computing systems, environments, and/or configurations that may be suitable for use include, but are not limited to, personal computers (PCs), server computers, handheld or laptop devices, multiprocessor systems, microprocessor-based systems, network PCs, minicomputers, mainframe computers, embedded systems, distributed computing environments that include any of the previously-described systems or devices, and the like.

Computer-executable instructions, such as program modules, being executed by a computer may be used. Generally, program modules include routines, programs, objects, components, data structures, etc., that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 8, an example system for implementing aspects described herein includes a computing device, such as computing device 800. In its most basic configuration, computing device 800 typically includes at least one processing unit 802 and memory 804. Depending on the exact configuration and type of computing device, memory 804 may be volatile (such as random access memory (RAM)), non-volatile (such as read-only memory (ROM), flash memory, etc.), or some combination of the two. This most basic configuration is illustrated in FIG. 8 by dashed line 806.

Computing device 800 may have additional features/functionality. For example, computing device 800 may include additional storage (removable and/or non-removable) including, but not limited to, magnetic or optical disks or tape. Such additional storage is illustrated in FIG. 8 by removable storage 808 and non-removable storage 810.

Computing device 800 typically includes a variety of computer readable media. Computer readable media can be any available media that can be accessed by computing device 800 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 804, removable storage 808, and non-removable storage 810 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of computing device 800.

Computing device 800 may also contain communications connection(s) 812 that allow the device to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts previously described. Rather, the specific features and acts previously described are disclosed as example forms of implementing the claims.

The invention claimed is:

1. A system for performing a transaction, the system comprising a hardware processor and a memory in a computing apparatus that:
   when a first server receives, from a client computer associated with a user, a request to perform the transaction, the first server forwards the request to a second server such that the second server is able to perform the request, wherein the first server comprises an application server hosting a delayed reply handler, wherein the second server comprises at least one of an application server or a database server;
   when the first server determines that an amount of time has expired without a reply to said request having been received by the first server and a status of the transaction is unknown to the first server based on a time the request was sent and a timeout associated with the request, the first server further:
      receives, via the delayed reply handler, a delayed reply from the second server, wherein the delayed reply is associated with the request, wherein the delayed reply indicates the status of the transaction as successful or failed;
      determines, via the delayed reply handler, based on the delayed reply, whether the transaction associated with the delayed reply has succeeded or failed;
      updates, via the delayed reply handler, the status of the transaction as determined via the delayed reply handler;
      determines, via the delayed reply handler, an action to automatically handle the delayed reply, wherein the action is associated with the transaction requested in the request, wherein the action is based on said delayed reply indicating that the transaction has succeeded or failed and on a transaction type of said transaction requested in the request;
      performs, via the delayed reply handler, said action to automatically handle said delayed reply; and
      transmits, via the delayed reply handler, to the client computer, for display to the user, a message informative of the status of the transaction and the action that will be taken based on the delayed reply.

2. The system of claim 1, wherein the computing apparatus:
   facilitates, by the first server, a display to the client computer, of a message asking said user to wait between when said request is sent and when said amount of time expires; and
   after said amount of time expires, the first server informs said user via the client computer that said user will be advised of a resolution of the transaction.

3. The system of claim 1, wherein said action comprises advising the user of a resolution of said transaction.

4. The system of claim 1, wherein the request is a first request, wherein said delayed reply indicates that the transaction failed, and wherein said action comprises the delayed reply handler issuing at least a second request to perform the transaction and advising the user of who initiated the transaction when the transaction has succeeded.

5. The system of claim 1, wherein said delayed reply indicates that the transaction succeeded, and wherein said action comprises causing said transaction to be returned to a state expected by the user.

6. The system of claim 1, wherein the computing apparatus: receives, by the first server, from the user, a communication that initiates the transaction.

7. The system of claim 1, wherein said delayed reply handler is part of, or used by, an adapter on behalf of the client computer, wherein said delayed reply handler being a component that is separate from said adapter.

8. A method of performing a transaction, the method comprising:
   in response to receiving, by a first server, from a client computer associated with a user, a request to perform the transaction, forwarding, by the first server, the request to a second server such that the second server is able to perform the request, wherein the first server comprises an application server hosting a delayed reply handler, wherein the second server comprises at least one of an application server or a database server;
   in response to determining, by the first server, that an amount of time has expired without a reply to said request having been received by the first server and a status of the transaction is unknown to the first server based on a time the request was sent and a timeout associated with the request:
      receiving, by the first server, via the delayed reply handler, a delayed reply from the second server, wherein the delayed reply is associated with the request, wherein the delayed reply indicates the status of the transaction as successful or failed;
      determining, by the first server, via the delayed reply handler, based on the delayed reply, whether the transaction associated with the delayed reply has succeeded or failed;
      updating, by the first server, via the delayed reply handler, the status of the transaction as determined via the delayed reply handler;
      determining, by the first server, via the delayed reply handler, an action to automatically handle the delayed reply, wherein the action is related to the transaction requested in the request, wherein the action is based on said delayed reply indicating that the transaction has succeeded or failed and on a transaction type of said transaction requested in the request;
      performing, by the first server, via the delayed reply handler, said action to automatically handle said delayed reply using said delayed reply handler; and
      transmitting, by the first server, via the delayed reply handler, to the client computer, for display to the user, a message informative of the status of the transaction and the action that will be taken based on the delayed reply.

9. The method of claim 8, further comprising:

facilitating, by the first server, a display to the client computer of a message asking said user to wait between when said first request is sent and when said amount of time expires; and after said amount of time expires, informing, by the first server, said user via the client computer that said user will be advised of a resolution of the transaction.

10. The method of claim 8, wherein said action comprises advising the user of a resolution of said transaction.

11. The method of claim 8, wherein the request is a first request, wherein said delayed reply indicates that the transaction failed, and wherein said action comprises the delayed reply handler issuing at least a second request to perform the transaction and advising the user who initiated the transaction when the transaction has succeeded.

12. The method of claim 8, wherein said delayed reply indicates that the transaction succeeded, and wherein said action comprises causing said transaction to be returned to a state expected by the user.

13. The method of claim 8, further comprising:

receiving, by the first server, from the user, a communication that initiates the transaction.

14. The method of claim 8, wherein said delayed reply handler is part of, or used by, an adapter on behalf of the client computer, wherein said delayed reply handler being a component that is separate from said adapter.

15. A non-transitory computer-readable medium comprising a set of computer-readable instructions for performing a transaction, said set of computer-readable instructions comprising one or more instructions that cause a system to:

receive, by a first server, from a client computer associated with a user, a request to perform the transaction, wherein the first server comprises an application server hosting a delayed reply handler;

forward, by the first server, the request to a second server such that the second server is able to perform the request, wherein the second server comprises at least one of an application server or a database server;

upon receiving, by the first server, from the client computer, an indication that an amount of time has expired without a reply to said request having been received and a status of the transaction is unknown to the first server based on a time the request was sent and a timeout associated with the request:

receive, by the first server, via the delayed reply handler, a delayed reply from the second server, wherein the delayed reply is associated with the request, wherein the delayed reply indicates the status of the transaction as successful or failed;

determine, by the first server, via the delayed reply handler, based on the delayed reply, whether the transaction associated with the delayed reply has succeeded or failed;

update, by the first server, via the delayed reply handler, the status of the transaction as determined via the delayed reply handler;

determine, by the first server, via the delayed reply handler, an action to automatically handle the delayed reply, wherein the action is related to the transaction requested via the request, wherein the action is based on said delayed reply indicating that the transaction has succeeded or failed and a transaction type of said transaction requested in the request;

perform, by the first server, via the delayed reply handler, said action to automatically handle said delayed reply; and transmit, by the first server, via the delayed reply handler, to the client computer, for display to the user, a message informative of the status of the transaction and the action that will be taken based on the delayed reply.

16. The non-transitory computer-readable medium of claim 15, further comprising one or more instructions that cause the system to:

facilitate, by the first server, a display to the user of a message asking said user to wait between when said request is sent and when said amount of time expires; and after said amount of time expires, inform, by the first server, said user that said user will be advised of a resolution of the transaction.

17. The non-transitory computer-readable medium of claim 15, wherein said action comprises advising the user of a resolution of said transaction.

18. The non-transitory computer-readable medium of claim 15, wherein the request is a first request, wherein said delayed reply indicates that the transaction failed, and wherein said action comprises the delayed reply handler issuing at least a second request to perform the transaction and advising the user who initiated the transaction when the transaction has succeeded.

19. The non-transitory computer-readable medium of claim 15, wherein said delayed reply indicates that the transaction succeeded, and wherein said action comprises causing said transaction to be returned to a state expected by the user.

20. The non-transitory computer-readable medium of claim 15, further comprising one or more instructions that cause the system to: receive, by the first server, from the user, a communication that initiates the transaction.

21. The non-transitory computer-readable medium of claim 15, wherein said delayed reply handler is part of, or used by, an adapter on behalf of the client computer, wherein said delayed reply handler being a component that is separate from said adapter.

* * * * *